(12) United States Patent
Nishimura et al.

(10) Patent No.: US 10,613,192 B2
(45) Date of Patent: Apr. 7, 2020

(54) POSITION DETECTION SYSTEM

(71) Applicant: Murata Manufacturing Co., Ltd., Kyoto (JP)

(72) Inventors: Tetsu Nishimura, Kyoto (JP); Nobumitsu Amachi, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/509,741

(22) Filed: Jul. 12, 2019

(65) Prior Publication Data

US 2019/0331760 A1 Oct. 31, 2019

Related U.S. Application Data

(63) Continuation of application No. PCT/JP2018/001256, filed on Jan. 17, 2018.

(30) Foreign Application Priority Data

Jan. 20, 2017 (JP) .................... 2017-008758

(51) Int. Cl.
*H04W 24/00* (2009.01)
*G01S 5/14* (2006.01)
(Continued)

(52) U.S. Cl.
CPC .............. *G01S 5/14* (2013.01); *G01S 5/0221* (2013.01); *G01S 5/0226* (2013.01); *G01S 11/06* (2013.01)

(58) Field of Classification Search
None
See application file for complete search history.

(56) References Cited

U.S. PATENT DOCUMENTS

2007/0290855 A1 12/2007 Nagino et al.
2016/0295362 A1* 10/2016 Ronse .................. H04W 4/021
2018/0124586 A1 3/2018 Ikezaki et al.

FOREIGN PATENT DOCUMENTS

JP 3587448 A 11/2004
JP 2007-101261 A 4/2007
(Continued)

OTHER PUBLICATIONS

International Search Report for International Application No. PCT/JP2018/001256 dated Apr. 3, 2018.
(Continued)

*Primary Examiner* — Erika A Washington
(74) *Attorney, Agent, or Firm* — Pearne & Gordon LLP

(57) ABSTRACT

A position detection system includes a transmitter that transmits a first beacon signal with a first strength and at a first incidence and that transmits a second beacon signal with a second strength, which is greater than the first strength, and at a second incidence, which is lower than the first incidence, a plurality of receivers that are installed at known positions different from each other and that measure signal strengths of the first beacon signal and the second beacon signal, and a calculator that performs first processing in which the position of the transmitter is detected on the basis of a signal strength of the first beacon signal measured by one of the receivers and second processing in which the position of the transmitter is detected on the basis of signal strengths of the second beacon signal measured by two or more of the receivers.

16 Claims, 7 Drawing Sheets

(51) Int. Cl.
  *G01S 5/02*    (2010.01)
  *G01S 11/06*   (2006.01)

(56)           References Cited

FOREIGN PATENT DOCUMENTS

JP    2009-152660 A    7/2009
JP    2010-204028 A    9/2010
JP    2016-169954 A    9/2016
JP    2016-223854 A    12/2016
WO    2006/092858 A1   9/2006

OTHER PUBLICATIONS

Written Opinion for International Application No. PCT/JP2018/001256 dated Apr. 3, 2018.

* cited by examiner

POSITION DETECTION SYSTEM

This is a continuation of International Application No. PCT/JP2018/001256 filed on Jan. 17, 2018 which claims priority from Japanese Patent Application No. 2017-008758 filed on Jan. 20, 2017. The contents of these applications are incorporated herein by reference in their entireties.

BACKGROUND OF THE DISCLOSURE

Field of the Disclosure

The present disclosure relates to a position detection system, and particularly to a technology for detecting the position of a transmitter by using a signal transmitted from the transmitter.

Description of the Related Art

Hitherto, a technology for detecting the position of a transmitter by using a signal transmitted from the transmitter has been known (for example, Patent Document 1).

The position detection system disclosed in Patent Document 1 has a receiver that receives a first signal from an object the position of which is to be detected and second signals from a plurality of positions for which position confirmation has already been performed, and a position detection means for detecting the position of the object by using the first signal and the second signals received by the receiver.

According to the position detection system of Patent Document 1, the field strength of the first signal is compared with the field strengths of the second signals in the same radio wave environment (for example, under the effect of the same obstacles), and thus it will be possible to detect the position with high accuracy.

Patent Document 1: Japanese Patent No. 3587448

BRIEF SUMMARY OF THE DISCLOSURE

The present inventors are studying a position detection system that uses a beacon signal transmitted from a transmitter and that is superior in terms of position detection speed. In such a position detection system, for example, a transmitter is attached to a semifinished product on a factory floor, and an application to process log management is expected by which it is detected in a pinpointing manner and promptly that the semifinished product has passed through the management points in respective processes (for example, the entering points and the exit points).

In an application to process log management, it is desired that the speed of position detection be increased because it is necessary to promptly detect that a semifinished product has passed through a management point. On the other hand, for example, the speed of position detection can be increased by simply increasing the transmission incidence of a beacon signal. However, in that case, inconvenience arises in that the average power consumption of the transmitter increases and the incidence of battery replacement increases. In addition, there is concern that beacon signal congestion tends to occur when many transmitters transmit a beacon signal at high incidence.

Thus, an object of the present disclosure is to provide a position detection system that is superior in terms of position detection speed and in which the average power consumption of transmitters is less likely to increase and beacon signal congestion is less likely to occur.

In order to realize the object, a position detection system according to an embodiment of the present disclosure includes a transmitter that transmits a first beacon signal with a first strength and at a first incidence and that transmits a second beacon signal with a second strength, which is greater than the first strength, and at a second incidence, which is lower than the first incidence, a plurality of receivers that are installed at known positions different from each other and that measure signal strengths of the first beacon signal and the second beacon signal, and a calculator that performs first processing in which the position of the transmitter is detected on the basis of a signal strength of the first beacon signal measured by one receiver among the plurality of receivers and second processing in which the position of the transmitter is detected on the basis of signal strengths of the second beacon signal measured by two or more receivers among the plurality of receivers.

With this configuration, the first beacon signal is transmitted with a small transmission strength and at a high transmission incidence. Thus, compared with a case in which the transmission incidence of the first beacon signal is simply increased, the average power consumption of the transmitter is reduced. In this disclosure, "transmission incidence(s)" or "incidence(s)" means how often a certain signal is transmitted.

Since the coverage of the first beacon signal is narrow and the first beacon signal is received only by a receiver when the transmitter comes near the receiver, and thus congestion is less likely to occur even when the transmission incidence of the first beacon signal is high. In addition, since the transmission incidence of the first beacon signal is high, the first beacon signal is immediately received when the transmitter comes near the receiver. Thus, by using the first beacon signal, it is detected in a pinpointing manner and promptly that the transmitter is near a specific receiver.

In addition, since the second beacon signal is transmitted with a high transmission strength, the coverage of the second beacon signal is wide and a plurality of receivers can receive the second beacon signal. Thus, even in a case where the first beacon signal cannot be received, the position of the transmitter can be detected using the signal strengths of the second beacon signal measured by two or more receivers. In addition, since the transmission incidence of the second beacon signal is low, even when the coverage of the second beacon signal is wide, congestion is less likely to occur and the average power consumption of the transmitter is not excessively increased.

As a result, the position detection system is obtained, which is superior in terms of position detection speed and in which the average power consumption of transmitters is less likely to increase and congestion of the beacon signals is less likely to occur.

In addition, the transmitter may add, to the first beacon signal and the second beacon signal, type information indicating whether the beacon signal is either a first beacon signal or a second beacon signal and transmit the first beacon signal and the second beacon signal.

With this configuration, whether a received beacon signal is either a first beacon signal or a second beacon signal can be determined by using the type information, and thus it makes easier to control for applying one processing to the first beacon signal and a different processing to the second beacon signal.

In addition, the transmitter may transmit the first beacon signal through a single frequency channel and the second beacon signal through a plurality of frequency channels.

With this configuration, in a case where there are other wireless signals that use the same frequency channel as the first beacon signal and the second beacon signal within a detection area, it is possible to reduce disturbance due to the other wireless signals while reducing an increase in power consumption.

Specifically, in a case where a receiver can receive the first beacon signal, the coverage of which is narrow, the transmitter and the receiver are sufficiently close to each other, and even when there are other wireless signals using the same frequency channel as the first beacon signal, the other wireless signals are less likely to practically interfere with the first beacon signal. Thus, an increase in power consumption is avoided by transmitting the first beacon signal through a single frequency channel.

On the other hand, transmission of a second beacon signal through a plurality of frequency channels makes it possible for receivers to assuredly receive the second beacon signal transmitted through a frequency channel that is not used by other wireless signals.

In addition, the transmitter may transmit, after transmitting a first beacon signal, a subsequent first beacon signal after a first waiting time has elapsed, and may transmit, after transmitting a second beacon signal, a subsequent first beacon signal after a second waiting time has elapsed, which is longer than the first waiting time.

With this configuration, in a case where the transmitter is battery powered, the battery voltage temporarily significantly decreases when a second beacon signal having a high strength is transmitted. Thus, by setting the second waiting time to be long and waiting for the battery voltage to recover, a subsequent first beacon signal can be more stably transmitted.

In addition, the transmitter is attached to a mobile unit, and at least one receiver among the plurality of receivers may be arranged on the line of flow of the mobile unit.

With this configuration, the position of the mobile unit can be detected in a pinpointing manner and promptly by using the positions of the receivers arranged on the line of flow, and thus this configuration can be applied to, for example, process log management.

In addition, the plurality of receivers may be installed at a density of three or more receivers per coverage area of the second beacon signal.

With this configuration, trilateration may be performed using the second beacon signal.

According to the present disclosure, a position detection system is obtained that is superior in terms of position detection speed and in which the average power consumption of transmitters is less likely to increase and congestion of the beacon signals is less likely to occur.

DETAILED DESCRIPTION OF THE DISCLOSURE

Figure 1:
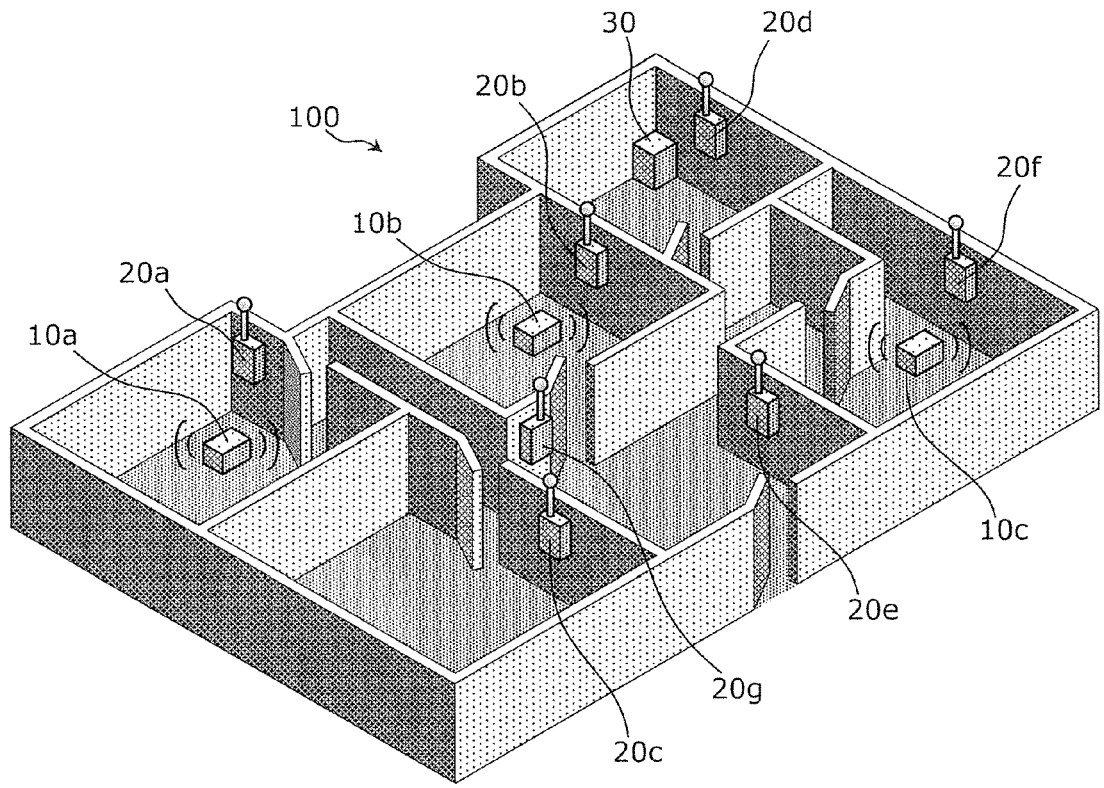
FIG. 1 is a schematic diagram illustrating an example of the installation of a position detection system according to a first embodiment.

In the following, embodiments according to the present disclosure will be described in detail using the drawings. Note that all the embodiments described below show general or specific examples. For example, numbers, shapes, materials, structural elements, arrangement and connection patterns of the structural elements, steps, and the order of steps indicated in the following embodiments are examples, and these are not intended to limit the present disclosure. Among structural elements in the following embodiments, the structural elements that are not stated in an independent claim will be described as arbitrary structural elements. In addition, the sizes of structural elements illustrated in the drawings and the ratio between the sizes are not always precise.

First Embodiment

A position detection system according to a first embodiment is a system which measures the signal strength of a beacon signal emitted from a transmitter by a plurality of receivers installed at known positions different from each other and which detects the position of the transmitter on the basis of the measured signal strengths.

FIG. 1 is a schematic diagram illustrating an example of the installation of a position detection system 100. In the example in FIG. 1, a transmitter that transmits a beacon signal is attached to mobile units 10$a$ to 10$c$ moving in a facility. In addition, fixed stations 20$a$ to 20$g$ and a server 30 are installed in the facility. The fixed stations 20$a$ to 20$g$ have a receiver that measures the signal strengths of beacon signals emitted from the mobile units 10$a$ to 10$c$. The signal strength is typically represented by a received signal strength indicator RSSI.

Figure 2:
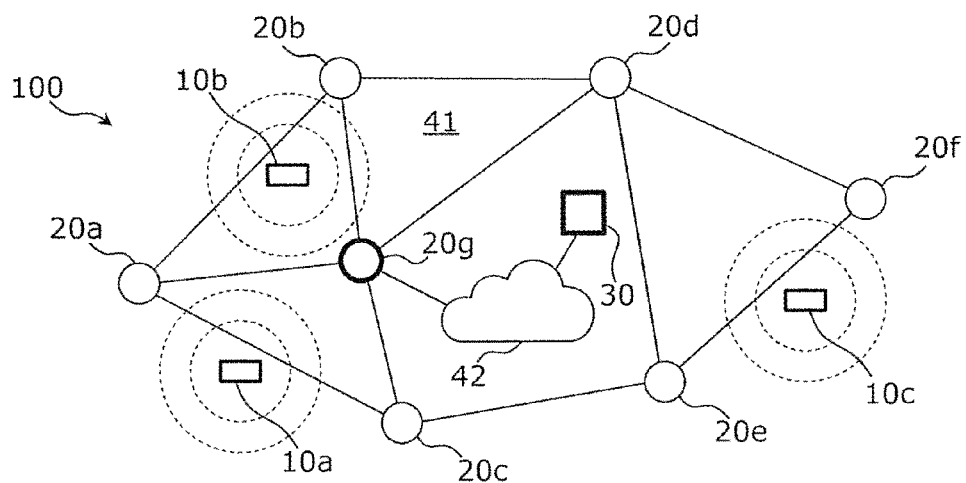
FIG. 2 is a schematic diagram illustrating an example of the configuration of a communication network provided in the position detection system according to the first embodiment.

FIG. 2 is a schematic diagram illustrating an example of the configuration of a communication network provided in the position detection system 100. As illustrated in FIG. 2, the fixed stations 20$a$ to 20$g$ form a wireless mesh network 41, and the fixed station 20$g$ has a gateway device (router) that is connected to a communication network 42, examples of which include a local area network (LAN) and the Internet. Any of the fixed stations 20$a$ to 20$g$ may have the gateway device, or the gateway device may be provided separately from the fixed stations 20$a$ to 20$g$. The fixed stations 20a to 20g and the server 30 are connected to each other such that communication is possible via the wireless mesh network 41 and the communication network 42.

Figure 3:
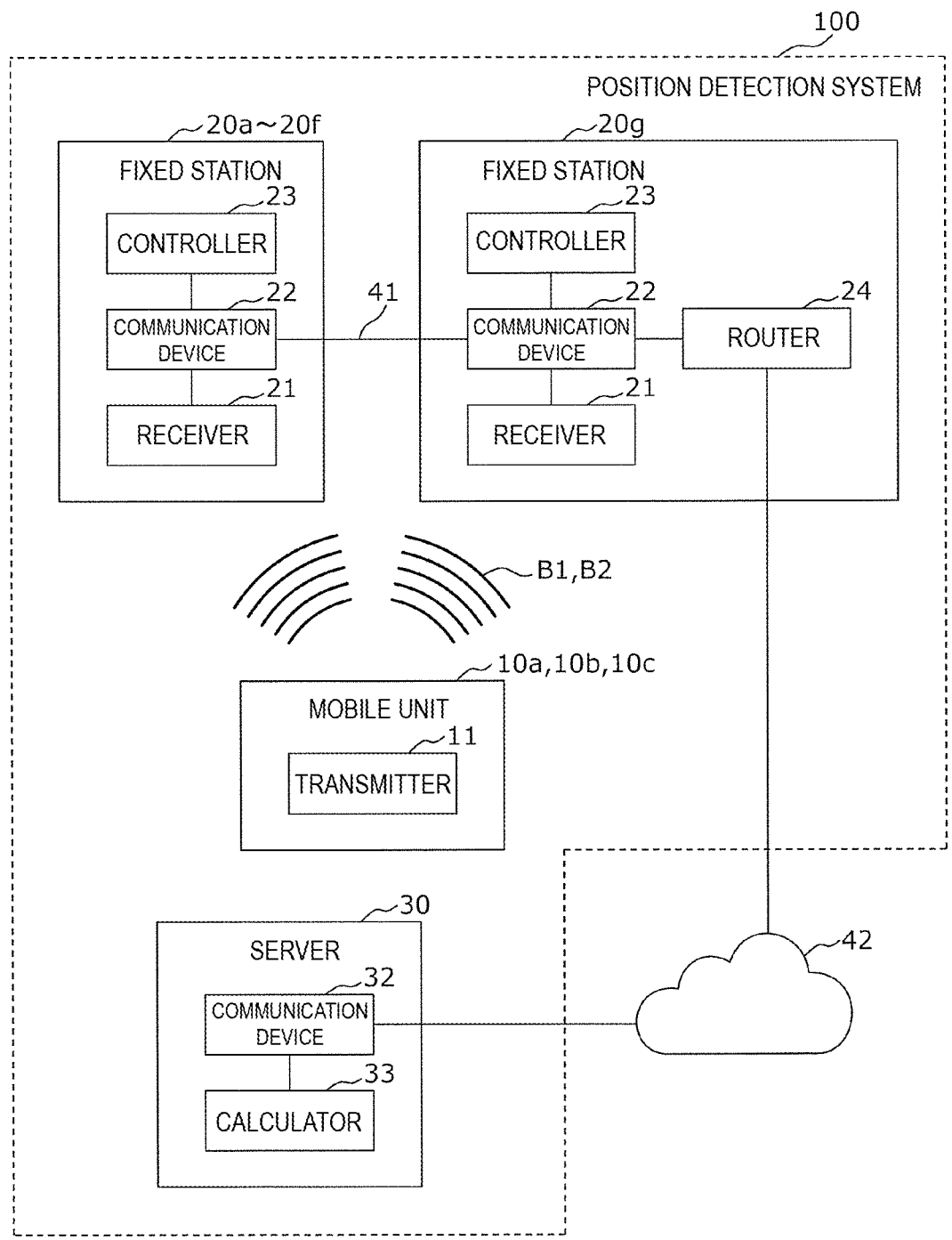
FIG. 3 is a block diagram illustrating an example of a functional configuration of the position detection system according to the first embodiment.

FIG. 3 is a block diagram illustrating an example of a functional configuration of the position detection system 100.

A transmitter 11 is attached to the mobile units 10a to 10c.

The transmitter 11 transmits two kinds of beacon signals B1 and B2. The beacon signals B1 and B2 will be described in detail later. The transmitter 11 may be a wireless device that operates in accordance with short-range wireless communication standards superior in terms of power saving, examples of which include Zigbee® and Bluetooth® low energy (hereinafter referred to as BLE).

The fixed stations 20a to 20g have a receiver 21, a communication device 22, and a controller 23. The fixed station 20g further has a router 24.

The receivers 21 measure RSSIs of the beacon signals B1 and B2 transmitted from the transmitter 11. The receivers 21 may be, for example, wireless devices that operate in accordance with the same wireless communication standards as the transmitter 11.

The communication devices 22 form the wireless mesh network 41 for connecting the fixed stations 20a to 20f to each other. The communication devices 22 may be, for example, wireless devices that operate in accordance with short-range wireless communication standards superior in terms of power saving, examples of which include Zigbee® and BLE. In a case where the communication devices 22 operate in accordance with the same wireless communication standards as the wireless communication standards for the beacon signals B1 and B2, some or all of the communication devices 22 and the corresponding receivers 21 may be shared.

The controllers 23 control the operations of the fixed stations 20a to 20g. The controllers 23 may be for example one-chip microcomputers (not illustrated) having, for example, a processor, a memory, and an input-output port. The controllers 23 may control the operations of the fixed stations 20a to 20g by using software functions realized by the processors executing the programs recorded in the memories.

The router 24 relays the data between the wireless mesh network 41 and the communication network 42. The router 24 may include a network adapter for establishing a connection to the communication network 42.

The server 30 has a communication device 32 and a calculator 33.

The communication device 32 connects the server 30 to the fixed stations 20a to 20g such that the communication is possible. The communication device 32 may be, for example, a network adapter for establishing a connection to the communication network 42.

The calculator 33 acquires via the communication device 32 the RSSIs of the beacon signals B1 and B2 measured by the receivers 21, and detects the position of the transmitter 11 on the basis of the acquired RSSIs. Detection of the position of the transmitter 11 includes detecting that the transmitter 11 is located near a certain receiver 21 and detecting that the transmitter 11 is located within a range surrounded by a plurality of receivers 21. The calculator 33 may be for example a general-purpose computer device (not illustrated) in which, for example, a processor and a memory are connected via a bus. The calculator 33 may acquire the RSSIs of the beacon signals B1 and B2 and detect the position of the transmitter 11 by using the software functions realized by the processor executing programs recorded in the memory.

Next, the beacon signals B1 and B2 transmitted from the transmitter 11 will be described.

Figure 4:
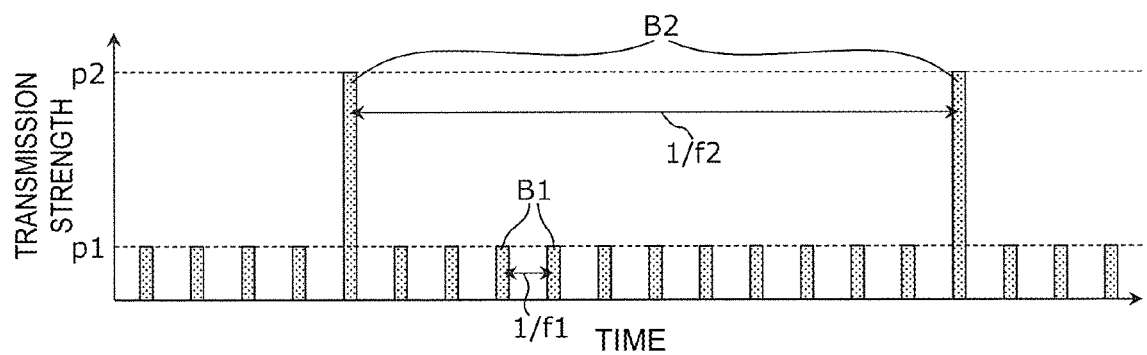
FIG. 4 is a diagram illustrating an example of transmission strengths and transmission incidences of beacon signals according to the first embodiment.

FIG. 4 is a diagram illustrating an example of the transmission strengths and the transmission incidences of the beacon signals B1 and B2.

The transmitter 11 transmits the beacon signal B1 with a strength p1 and at an incidence f1 and the beacon signal B2 with a strength p2 greater than the strength p1 and at an incidence f2 lower than the incidence f1. In this case, the beacon signal B1 and the beacon signal B2 are an example of a first beacon signal and an example of a second beacon signal, respectively. In FIG. 4, the transmission intervals of the beacon signals B1 and B2 are conceptually represented as reciprocals 1/f1 and 1/f2 of the transmission incidences f1 and f2.

The strengths p1 and p2 are not especially limited; however, as an example, they may be set as in the following in association with the arrangement of the receivers 21. That is, the strength p1 is set to a size having narrow coverage in which the beacon signal B1 can reach only one receiver 21. In addition, the strength p2 is set to a size having wide coverage in which the beacon signal B2 can reach three or more receivers 21 no matter where in a detection area the transmitter 11 is located.

It is sufficient that the incidences f1 and f2 are set as needed in accordance with the specifications of the position detection system 100. As a non-restrictive example, the incidence f1 may be an interval of 1 second (that is, 1/f1=1 second), and the incidence f2 may be an interval of 12 seconds (that is, 1/f2=12 seconds). In addition, in a case where the transmission timings of the beacon signals B1 and B2 coincide with each other, the transmission of the beacon signal B1 may be omitted, and only the beacon signal B2 may be transmitted.

The beacon signals B1 and B2 may be a RSSI measurement packet represented by a broadcast packet defined in the communication standards for the wireless mesh network 41.

Figure 5:
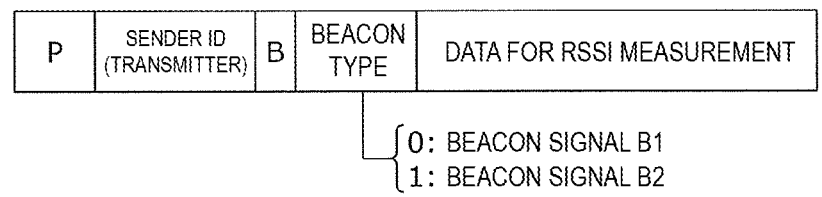
FIG. 5 is a diagram illustrating an example of the format of a RSSI measurement packet according to the first embodiment.

FIG. 5 is a diagram illustrating an example of the format of a RSSI measurement packet. In the example in FIG. 5, the RSSI measurement packet (that is, the beacon signals B1, B2) is a broadcast packet including five fields, which are a preamble P, a sender ID, a broadcast flag B, a beacon type, and the data for RSSI measurement.

The preamble P is a bit string indicating a start end of a packet defined in the communication standards.

The sender ID is the information indicating the ID of the transmitter 11 that has transmitted a beacon signal.

The broadcast flag B is the information indicating that the packet does not include a specific destination ID and is addressed to all nodes.

The beacon type is the type information indicating that the packet is either the beacon signal B1 or B2. The beacon type may be, as an example, 1-bit information representing the beacon signal B1 as 0 and the beacon signal B2 as 1.

The data for RSSI measurement is arbitrary data used to measure a RSSI.

As the beacon signals B1, B2, the transmitter 11 transmits a RSSI measurement packet illustrated in FIG. 5 with the transmission strength and at the transmission incidence illustrated in FIG. 4.

In the fixed stations 20a to 20g, the receiver 21 measures the RSSI of the beacon signals B1, B2, and the communication device 22 transmits a RSSI report packet including the measurement result to the server 30.

The RSSI report packet may also be represented by a unicast packet defined in the communication standards for the wireless mesh network 41.

Figure 6:
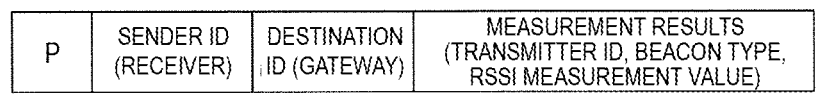
FIG. 6 is a diagram illustrating an example of the format of a RSSI report packet according to the first embodiment.

FIG. 6 is a diagram illustrating an example of the format of a RSSI report packet. In the example in FIG. 6, the RSSI report packet is a unicast packet including four fields, which are a preamble P, a sender ID, a destination ID, and a measurement result.

The sender ID is the information indicating the ID of a receiver 21 that has measured a RSSI (that is, that has received a RSSI measurement packet).

The destination ID is the information indicating the ID of the communication device 22 of the fixed station 20g having the gateway device.

The measurement result is the data representing a copy of the transmitter ID and the beacon type included in the RSSI measurement packet and a RSSI measurement value.

The RSSI report packet is relayed by the communication devices 22 of the fixed stations 20a to 20g, and is transmitted to the server 30 from the router 24 of the fixed station 20g via the communication network 42.

Next, a transmitter position detection process performed by the position detection system 100, which is configured as above, will be described.

Figure 7:
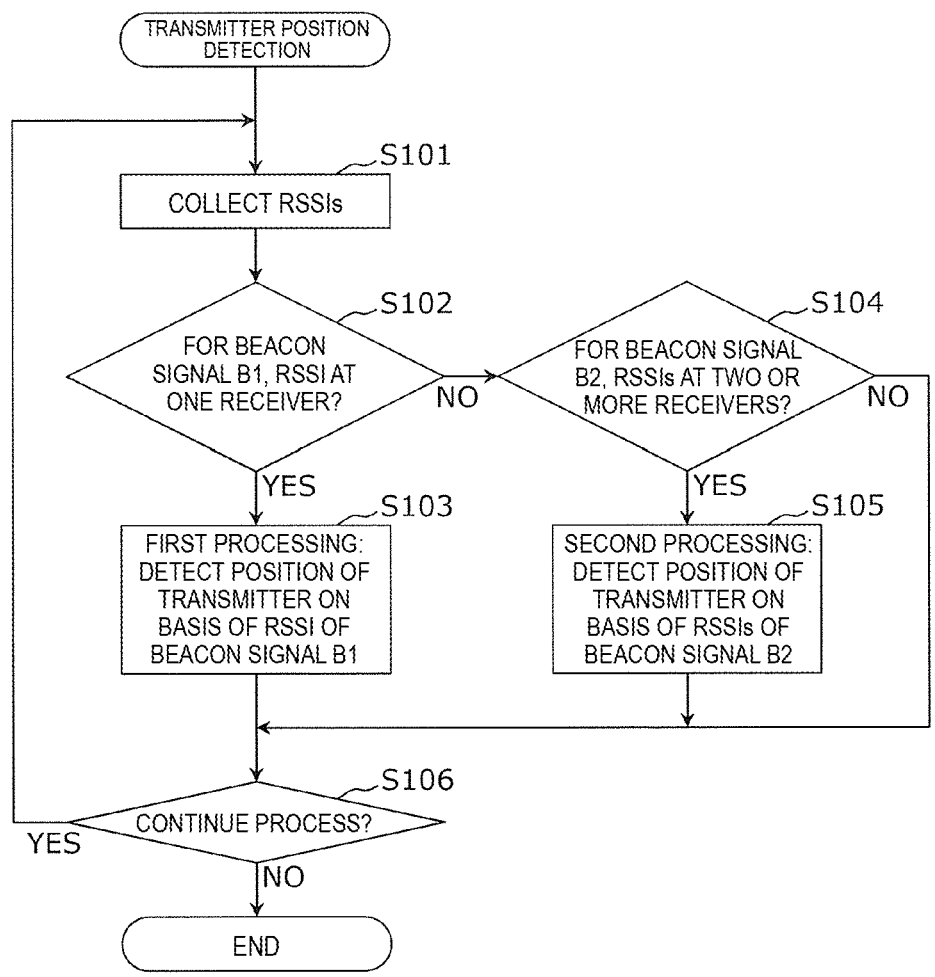
FIG. 7 is a flowchart illustrating an example of a transmitter position detection process according to the first embodiment.

FIG. 7 is a flowchart illustrating an example of the transmitter position detection process. FIG. 7 illustrates an example of a process for detecting the position of one transmitter 11, and the process is started when, for example, the mobile units 10a to 10c having the transmitter 11 enter a detection area, and a beacon signal from one of the transmitters 11 is first received by the receiver 21 of any of the fixed stations 20a to 20g. For each of the plurality of transmitters 11, the process in FIG. 7 may also be performed simultaneously.

The server 30 receives RSSI report packets from the fixed stations 20a to 20g, collects the RSSI measurement results of beacon signals B1 and B2, and summarizes the collected measurement results in terms of the transmission incidence f1 of the beacon signal B1 and the transmission incidence f2 of the beacon signal B2 (S101).

In a case where the measurement results summarized at the transmission incidence f1 of the beacon signal B1 include a RSSI of a beacon signal B1 measured by one of the receivers 21 (YES in S102), the first processing is performed to detect the position of the transmitter 11 on the basis of the RSSI (S103).

The first processing is processing for detecting that a transmitter 11 is located near a receiver 21 when, for example, the corresponding RSSI is greater than or equal to the threshold.

In a case where the measurement results summarized at the transmission incidence f2 of the beacon signal B2 include RSSIs of a beacon signal B2 measured by two or more of the receivers 21 (YES in S104), the second processing is performed to detect the position of the transmitter 11 on the basis of the RSSIs (S105).

The second processing is, for example, processing for detecting that a transmitter 11 is located at the distances corresponding to RSSIs from two or more respective receivers 21.

According to the transmitter position detection process, when the beacon signal B1 is received by one of the receivers 21, it can be detected in a pinpointing manner and promptly that the transmitter 11 is located near the receiver 21 by taking advantage of characteristics of the beacon signal B1 in that the coverage of the beacon signal B1 is narrow and the transmission incidence f1 is high. In addition, the estimated position of the transmitter 11 can be calculated in a wide-area manner from the signal strengths of the beacon signal B2 measured by two or more of the receivers 21 by taking advantage of a characteristic of the beacon signal B2 in that the coverage of the beacon signal B2 is wide.

Note that the position detection similar to the second processing may also be performed using a beacon signal B1. That is, in a case where there are RSSIs of the beacon signal B1 measured by two or more of the receivers 21 in measurement results summarized at the transmission incidence f1 of the beacon signal B1, it may be detected that the transmitter 11 is located at the distances corresponding to the RSSIs from the two or more respective receivers 21.

As described above, in the position detection system 100, a beacon signal B1 is transmitted with the transmission strength p1, which is low, and at the transmission incidence f1, which is high. Thus the average power consumption of the transmitter 11 is reduced, compared with a case where the transmission incidence of a beacon signal is simply increased to increase position detection speed.

Since the coverage of a beacon signal B1 is narrow and the beacon signal B1 is received only by a receiver 21 when the transmitter 11 comes near the receiver 21, congestion is less likely to occur even when the transmission incidence f1 is high. In addition, since the transmission incidence f1 of the beacon signal B1 is high, the beacon signal B1 is immediately received when the transmitter 11 comes near the receiver 21. Thus, by using a beacon signal B1, it is detected in a pinpointing manner and promptly that a transmitter 11 is near a specific receiver 21.

In addition, since a beacon signal B2 is transmitted with the transmission strength p2, which is high, the coverage of the beacon signal B2 is wide and a plurality of receivers 21 can receive the beacon signal B2. Thus, even in a case where a beacon signal B1 cannot be received, the position of the transmitter 11 can be detected using the signal strengths of the beacon signal B2 measured by two or more of the receivers 21. In addition, since the transmission incidence f2 of the beacon signal B2 is low, even when the coverage of the beacon signal B2 is wide, congestion is less likely to occur and the average power consumption of the transmitter 11 is not excessively increased.

As a result, the position detection system 100 is obtained, which is superior in terms of position detection speed and in which the average power consumption of transmitters is less likely to increase and congestion of the beacon signals B1 and B2 is less likely to occur.

Second Embodiment

In a second embodiment, an example of an application of the position detection system to process log management will be described.

Figure 8:
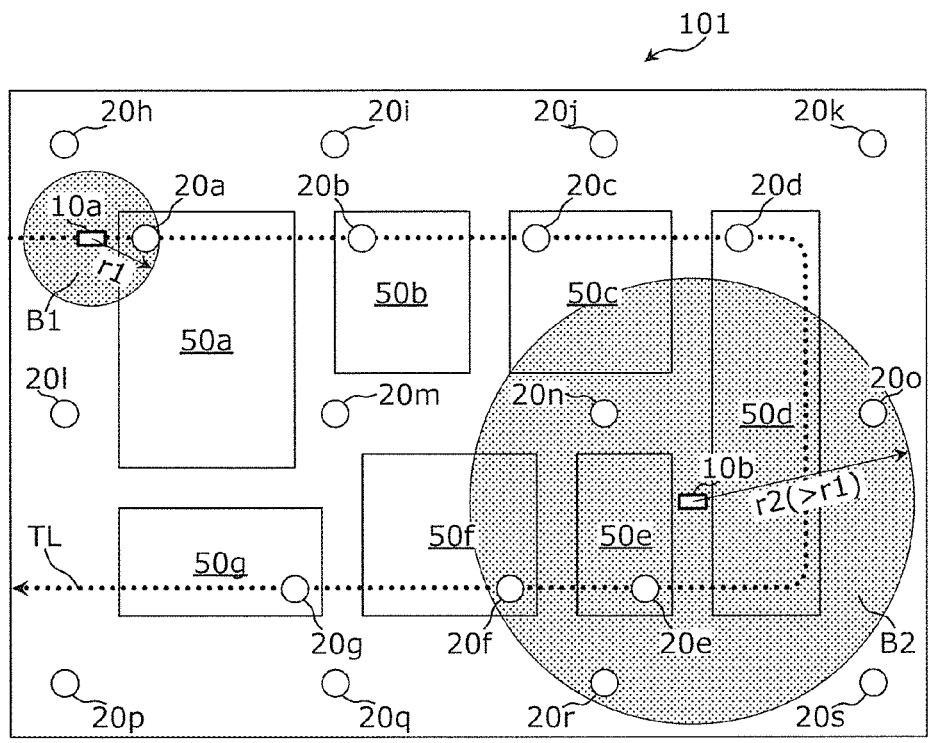
FIG. 8 is a plan view illustrating an example of the installation of a position detection system according to a second embodiment.

FIG. 8 is a plan view illustrating an example of the installation of a position detection system 101 according to the second embodiment. The position detection system 101 is installed together with manufacturing facilities 50a to 50g for the respective processes on a factory floor, and performs the process log management of a semifinished product sequentially processed by the manufacturing facilities 50a to 50g. In the position detection system 101, the semifinished product is an example of a mobile unit.

In FIG. 8, mobile units 10a and 10b and fixed station 20a to 20s are illustrated and servers are omitted. The configurations of the mobile units 10a and 10b and the fixed stations 20*a* to 20*s* are substantially the same as those illustrated in FIG. 3, and thus the description thereof will be omitted.

A transmitter 11 is attached to the mobile units 10*a* and 10*b* and transmits two kinds of beacon signals B1 and B2, as in the description of the first embodiment. FIG. 8 illustrates that the beacon signals B1 and B2 have, as coverage, a radius of r1 and a radius of r2 respectively, and illustrates a case in which the mobile units 10*a* and 10*b* transmit the beacon signals B1 and B2 respectively.

The fixed stations 20*a* to 20*g* are arranged on the line of flow of the mobile units 10*a* and 10*b*, that is, on the line of flow of the semifinished products on the factory floor. More specifically, the fixed stations 20*a* to 20*g* are arranged at the entering points from which the semifinished products enter the manufacturing facilities 50*a* to 50*g* for the respective processes. The fixed stations 20*a* to 20*g* do not have to be arranged at the entering points for the manufacturing facilities 50*a* to 50*g*, and may also be arranged at the points from which the semifinished products exit the manufacturing facilities 50*a* to 50*g*. That is, it is sufficient that the fixed stations 20*a* to 20*g* are installed at the management points in the respective processes.

In addition, the fixed stations 20*a* to 20*s* are arranged at positions such that a beacon signal B2 can reach the receivers 21 of three or more fixed stations among the fixed stations 20*a* to 20*s* no matter from where on the factory floor the beacon signal B2 is transmitted. In other words, the receivers 21 are installed at a density of three or more receivers per coverage area of the beacon signal B2, and the fixed stations 20*h* to 20*s* may be supplementally installed at positions that are not on the line of flow of the mobile units 10*a* and 10*b* in order to achieve such density.

With the position detection system 101 described above, the following advantages can be obtained in addition to the advantages of the position detection system 100.

That is, since the coverage of a beacon signal B1 is narrow, the detection can be performed only when the transmitter 11 comes near a receiver 21. In addition, since the transmission incidence of the beacon signal B1 is high, the beacon signal B1 is immediately detected when the transmitter 11 comes near the receiver 21. By taking advantage of these characteristics and by arranging the receivers 21 at points near the entering points in the respective processes on the factory floor, the position detection system 101 appropriate for the process log management can be obtained with which it is possible to promptly detect that the semifinished products have passed through the process management points.

It can also be detected that a semifinished product has passed through the process management points by reading a bar code attached to the semifinished product; however, the reading operation is significantly complicated. In this respect, significant power savings can be expected by using the position detection system 101.

In addition, since a beacon signal B2 has wide coverage, it is possible to detect a transmitter 11 by using a plurality of receivers 21 no matter where on the factory floor the transmitter 11 is located. Thus, it is useful to detect, for example, the location of a missing semifinished product on the factory floor.

Third Embodiment

In a third embodiment, a position detection system will be described in which beacon signals are transmitted through a plurality of frequency channels.

Figure 9:
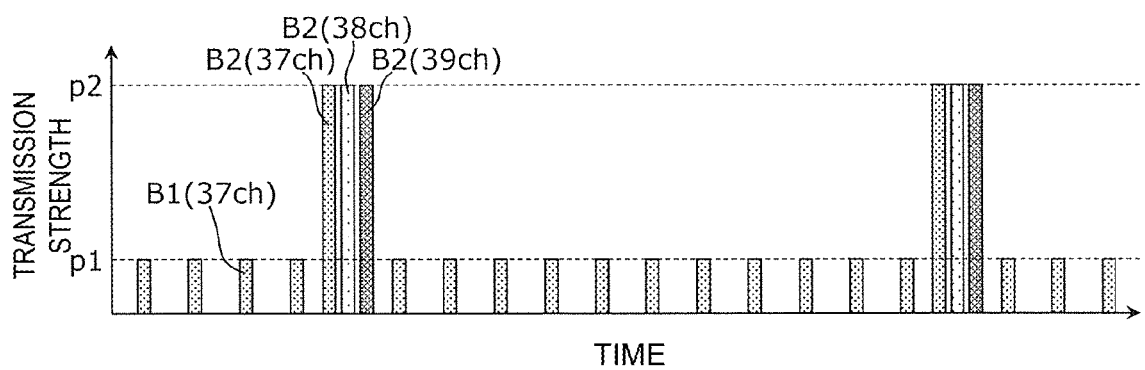
FIG. 9 is a diagram illustrating an example of frequency channels of beacon signals according to a third embodiment.

FIG. 9 is a diagram illustrating an example of beacon signals B1 and B2 according to the third embodiment. A case will be considered in which the beacon signals B1 and B2 are broadcast in accordance with, for example, BLE standards. In BLE, three frequency channels are allocated for broadcasting, which are 37*ch* (2402 MHz), 38*ch* (2426 MHz), and 39*ch* (2480 MHz). In the example in FIG. 9, the beacon signal B1 is transmitted through a single frequency channel (37*ch*), and the beacon signal B2 is transmitted through all the three frequency channels (37*ch*, 38*ch*, and 39*ch*).

Figure 10:
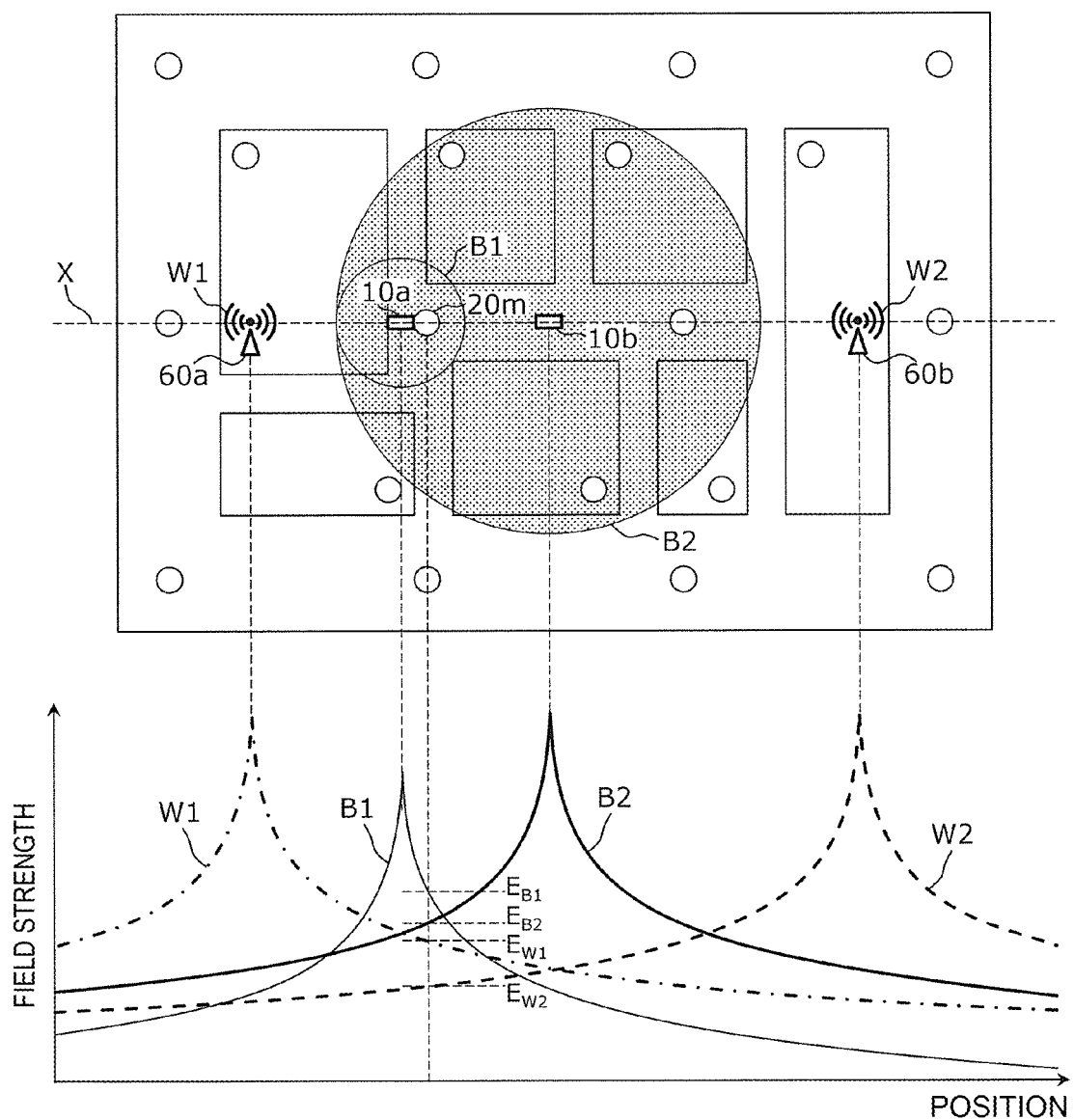
FIG. 10 includes diagrams for describing the advantages from beacon signals according to the third embodiment.

FIG. 10 includes diagrams for describing the advantages obtained in a case where a beacon signal B1 is transmitted through a single frequency channel and a beacon signal B2 is transmitted through a plurality of frequency channels.

A plan view in the upper portion of FIG. 10 illustrates wireless LAN devices 60*a* and 60*b* installed together with the position detection system 101 of FIG. 8 on the factory floor. The wireless LAN devices 60*a* and 60*b* transmit wireless signals W1 and W2, respectively. The wireless signals W1 and W2 are an example of other wireless signals using the same frequency as the beacon signals B1 and B2 within a detection area.

A graph in the lower portion of FIG. 10 illustrates the field strengths of the beacon signals B1 and B2 and those of the wireless signals W1 and W2 on a straight line X that passes through a fixed station 20*m*.

With reference to FIG. 10, a case will be described in which the beacon signals B1 and B2 are received by the fixed station 20*m*.

In a case where the beacon signal B1, the coverage of which is narrow, can be received by the fixed station 20*m*, a mobile unit 10*a* and the fixed station 20*m* are sufficiently close to each other. Thus, even when the wireless signals W1 and W2 use the same frequency channel as the beacon signal B1, the wireless signals W1 and W2 are less likely to practically interfere with the beacon signal B1 (field strength $E_{B1}$» field strength $E_{W1}$, $E_{W2}$). That is, since it is assumed that the beacon signal B1 is used for position detection in a narrow range, the need to avoid interference with the frequency channel of the wireless signals W1 and W2 is small.

Thus, for the beacon signal B1, an increase in power consumption is avoided by transmitting the beacon signal B1 through a single frequency channel, that is, by reducing the number of times of transmission.

On the other hand, the beacon signal B2 is less tolerant to the wireless signal W1 (field strength $E_{B2}$>field strength $E_{W1}$) at the fixed station 20*m*. That is, when the beacon signal B2 is transmitted through the same frequency channel as the wireless signal W1, the beacon signal B2 is likely to be disturbed by the wireless signal W1.

Thus, by transmitting the beacon signal B2 through a plurality of frequency channels, the beacon signal B2 transmitted through a frequency channel that is not used by the wireless signal can be assuredly received by the fixed station 20*m*.

In this manner, in a case where there are other wireless signals that use the same frequency as the beacon signals B1 and B2 within the detection area, it is possible to reduce disturbance due to the other wireless signals while reducing an increase in power consumption.

Fourth Embodiment

In a fourth embodiment, a position detection system will be described in which, after beacon signals B1 and B2 are transmitted and before a subsequent beacon signal B1 is transmitted, different waiting times are set for the respective beacon signals B1 and B2.

Figure 11:
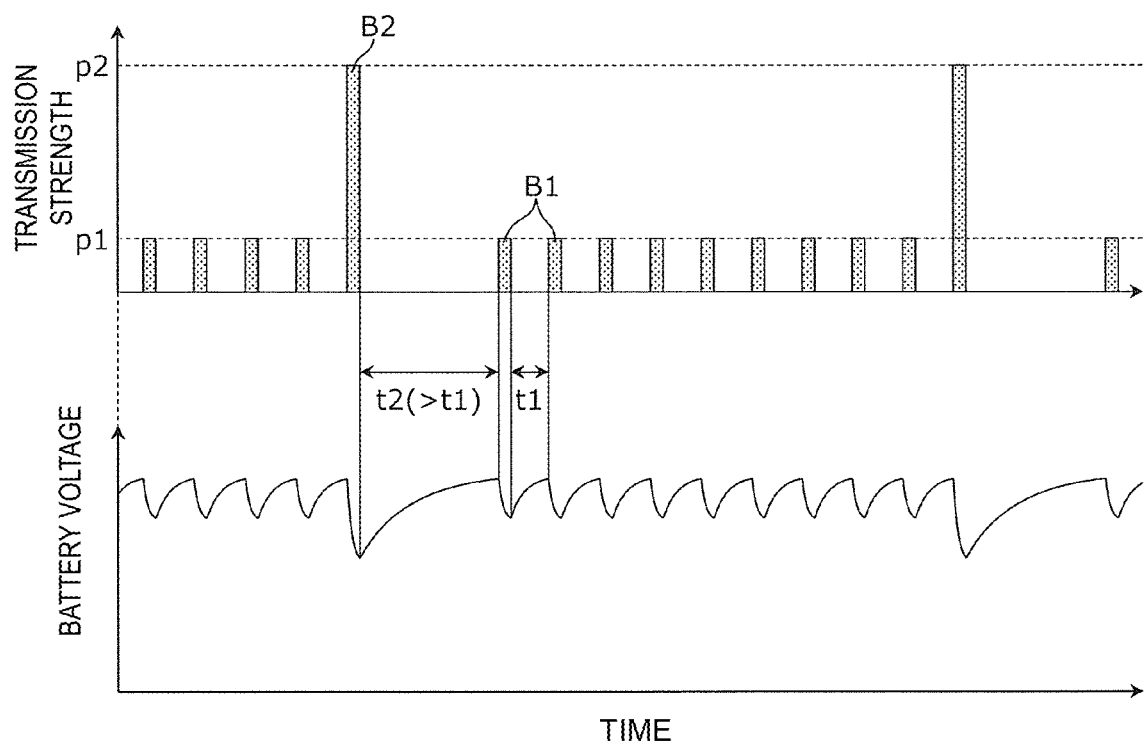
FIG. 11 includes graphs illustrating an example of transmission timings of beacon signals according to a fourth embodiment.

FIG. 11 includes graphs illustrating an example of transmission timings of beacon signals B1 and B2. The graph in the upper portion of FIG. 11 illustrates the transmission timings of the beacon signals B1 and B2. The graph in the lower portion of FIG. 11 illustrates an example of changes in battery voltage caused when the beacon signals B1 and B2 are transmitted.

In the example in FIG. 11, after a beacon signal B1 is transmitted, a subsequent beacon signal B1 is transmitted after a waiting time t1 has elapsed. In contrast, after a beacon signal B2 is transmitted, a subsequent beacon signal B1 is transmitted after a waiting time t2 has elapsed, which is longer than the waiting time t1 (that is, t2>t1).

Beacon signals B2 consume a lot of power, and thus the battery voltage temporarily falls after a beacon signal B2 is transmitted. The battery voltage can be recovered by setting the waiting time t2, which is longer than the waiting time after a beacon signal B1 is transmitted, after the beacon signal B2 is transmitted, and a subsequent beacon signal B1 can be stably transmitted.

In addition, right after a beacon signal B2 is transmitted, many of the receivers that have received the beacon signal B2 transmit a RSSI report packet. The RSSI report packets are transferred by all the receivers 21 within the wireless mesh network 41, and thus the traffic inside the wireless mesh network 41 temporarily significantly increases.

With this being the situation, by making some time free after the beacon signal B2 is transmitted and before the subsequent beacon signal B1 is transmitted, it is possible to wait for the traffic in the mesh network to decrease, thereby avoiding packet congestion.

Although the position detection systems according to the embodiments of the present disclosure are described above, the present disclosure is not limited to each of the embodiments. Embodiments obtained by making various modifications conceived by those skilled in the art to the present embodiments and embodiments obtained by combining structural elements from different embodiments may also fall within the scope of one or a plurality of modes of the present disclosure as long as those embodiments do not depart from the gist of the present disclosure.

The present disclosure can be widely used to detect the positions of objects and persons in various facilities for, for example, process log management of a semifinished product on a factory floor.

10a to 10c mobile unit
11 transmitter
20a to 20s fixed station
21 receiver
22 communication device
23 controller
24 router
30 server
32 communication device
33 calculator
41 wireless mesh network
42 communication network
50a to 50g manufacturing facility
60a, 60b wireless LAN device
100, 101 position detection system
B1, B2 beacon signal

The invention claimed is:

1. A position detection system comprising:
a transmitter configured to transmit a first beacon signal with a first strength at a first incidence, and to transmit a second beacon signal with a second strength at a second incidence, the second strength being greater than the first strength and the second incidence being lower than the first incidence;
a plurality of receivers that are installed at known positions different from each other and that are each configured to measure a reception signal strength of the first beacon signal and a reception signal strength of the second beacon signal; and
a calculator configured to determine a position of the transmitter based on the reception signal strength of the first beacon signal measured by one of the plurality of receivers, and to determine the position of the transmitter based on the reception signal strengths of the second beacon signal measured by two or more of the plurality of receivers.

2. The position detection system according to claim 1, wherein the transmitter is configured to include type information with the first beacon signal and the second beacon signal, the type information indicating whether the beacon signal is the first beacon signal or the second beacon signal.

3. The position detection system according to claim 2, wherein the transmitter is configured to transmit the first beacon signal through a single frequency channel and to transmit the second beacon signal through a plurality of frequency channels.

4. The position detection system according to claim 2, wherein the transmitter is configured to transmits a first subsequent beacon signal after a first waiting time following transmission of the first beacon signal, and to transmit a second subsequent beacon signal after a second waiting time following transmission of the second beacon signal, the second waiting time being longer than the first waiting time.

5. The position detection system according to claim 2, wherein:
the transmitter is attached to a mobile unit, and
at least one of the plurality of receivers is arranged on a line of flow of the mobile unit.

6. The position detection system according to claim 2, wherein the plurality of receivers are installed at a density of three or more receivers per coverage area of the second beacon signal.

7. The position detection system according to claim 1, wherein the transmitter is configured to transmit the first beacon signal through a single frequency channel and to transmit the second beacon signal through a plurality of frequency channels.

8. The position detection system according to claim 7, wherein the transmitter is configured to transmits a first subsequent beacon signal after a first waiting time following transmission of the first beacon signal, and to transmit a second subsequent beacon signal after a second waiting time following transmission of the second beacon signal, the second waiting time being longer than the first waiting time.

9. The position detection system according to claim 7, wherein:
the transmitter is attached to a mobile unit, and
at least one of the plurality of receivers is arranged on a line of flow of the mobile unit.

10. The position detection system according to claim 7, wherein the plurality of receivers are installed at a density of three or more receivers per coverage area of the second beacon signal.

11. The position detection system according to claim 1, wherein the transmitter is configured to transmit a first subsequent beacon signal after a first waiting time following transmission of the first beacon signal, and to transmit a second subsequent beacon signal after a second waiting time following transmission of the second beacon signal, the second waiting time being longer than the first waiting time.

12. The position detection system according to claim 11, wherein:
the transmitter is attached to a mobile unit, and
at least one of the plurality of receivers is arranged on a line of flow of the mobile unit.

13. The position detection system according to claim 11, wherein the plurality of receivers are installed at a density of three or more receivers per coverage area of the second beacon signal.

14. The position detection system according to claim 1, wherein:
the transmitter is attached to a mobile unit, and
at least one of the plurality of receivers is arranged on a line of flow of the mobile unit.

15. The position detection system according to claim 14, wherein the plurality of receivers are installed at a density of three or more receivers per coverage area of the second beacon signal.

16. The position detection system according to claim 1, wherein the plurality of receivers are installed at a density of three or more receivers per coverage area of the second beacon signal.

* * * * *